United States Patent
Ganesh et al.

(10) Patent No.: US 6,820,098 B1
(45) Date of Patent: Nov. 16, 2004

(54) SYSTEM AND METHOD FOR EFFICIENT AND TRACKABLE ASYNCHRONOUS FILE REPLICATION

(75) Inventors: Shivaji Ganesh, Milpitas, CA (US); Ramesh Kavanpillil, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 459 days.

(21) Appl. No.: 10/099,760

(22) Filed: Mar. 15, 2002

(51) Int. Cl.$^7$ .............................................. G06F 17/30
(52) U.S. Cl. ....................................................... 707/202
(58) Field of Search ............................... 707/200, 201, 707/202, 203, 204, 205; 711/162; 174/255

(56) References Cited

U.S. PATENT DOCUMENTS 6,153,833 A * 11/2000 Dawson et al. ............. 174/255
6,421,688 B1 * 7/2002 Song .......................... 707/203
6,578,120 B1 * 6/2003 Crockett et al. ............. 711/162

OTHER PUBLICATIONS

Hsiao, H.I. et al, Replicated data management in the Gamma database machine Nov. 1990, Management of Replicated Data, Dept. of Comp. Sci, Wisconsin University,Madison, WI, pp. 79–84.*

* cited by examiner

Primary Examiner—Diane D. Mizrahi

(57) ABSTRACT

A method is provided for asynchronously tracking the replication of data writes from an application that is subject to system and network failure, to a standby data processing unit located at a standby site. The method includes the step of enabling access to sequence numbers created for use in replication of the data writes. Another step is sending the data writes to a remote mirroring module. Next is assigning sequence numbers to each data write accepted. It can then be determined when data writes at a local site have been successfully replicated at the standby site by correlating the most recent local write sequence number and most recent replication sequence number. An additional step is initiating replication of the data writes for which replication has not taken place.

29 Claims, 5 Drawing Sheets

SYSTEM AND METHOD FOR EFFICIENT AND TRACKABLE ASYNCHRONOUS FILE REPLICATION

FIELD OF THE INVENTION

The present invention relates generally to asynchronous trackable file replication used for disaster recovery in computer systems. More particularly, the present invention relates to asynchronously tracking the replication of active log files used in mirroring to a standby data processing site.

BACKGROUND

In recent years, the use of networked computer software and the Internet has brought about a significant increase in the amount of network traffic and transactions performed by software applications residing on networked servers. More information is stored by these networked applications and in remote database applications than ever before. These applications process a large number of purchase transactions, credit card transactions, electronic mailing lists, email functions, data distribution, batch processing, etc. Such systems contain very critical data, which must be constantly backed up so the information is not lost. Further, application end users also desire that networked applications and data should be available 24 hours a day and 7 days a week.

To provide robust services that are constantly available, computer systems must have redundant backup systems. It is inevitable that the primary system will fail on occasion. When the primary system fails, a backup system must be quickly available. A backup system can be located on-site with the primary system and then a secondary backup system can be located at a physically remote backup site. Having at least one backup system on-site is valuable because the networked applications can immediately failover to that application, if the primary system fails or crashes. A second backup system at a remote site is desirable because it protects against catastrophic failure at the primary site. This is sometimes called the standby site. If the primary site is disabled by an extended power outage, fire, or another disaster, then the remote standby system will be activated. A failover to an off-site standby system is relatively slower, but it provides a maximum amount of protection against total system failure. Specifically, this type of fail-safe system is valuable for applications that are connected to the Internet which need to be constantly available. In the event of a failure, the standby system is always ready to take over. Usually, the standby system is located in another building or in a geographically remote area.

For certain transactional systems, such as a database, an active transaction log is kept which tracks recent transactions. An archive log is then kept to store information from the active log after the active log has been filled or a certain time period has passed. To be able to mirror a transactional system between the primary site and the standby site both the active logs and then the archive logs must be transferred to the standby system. The archived logs are then entered into or applied to the standby system, which constantly keeps the standby system current. The active logs at the standby system provide a record of the transactions not yet archived, and are utilized on failover to the standby site.

The mirroring is constantly occurring and transaction logs must constantly be replicated to keep a database and its backup system synchronized. Typically, the replication or mirroring must be asynchronous because the data is often sent over wide area networks whose response time can vary significantly.

SUMMARY OF THE INVENTION

The invention provides a method for asynchronously tracking the replication of data writes from an application that is subject to system and network failure, to a standby data processing unit located at a standby site. The method includes the step of enabling access to sequence numbers created for use in replication of the data writes. Another step is sending the data writes from an application write to a remote mirroring module. Sequence numbers are assigned to each write accepted. Next is tracking a most recent local write sequence number for a local data write and a most recent replication sequence number for replicated data writes. It can then be determined when a specific data write at the local site has been successfully replicated at the standby site by correlating the most recent local write sequence number and most recent replication sequence number. An additional step is initiating replication of the data writes for which replication has not taken place.

In accordance with another embodiment of the present invention, the system includes a method for handling overflow of disk spool writes in a remote mirroring unit subsequent to a network or system failure. This method includes the step of sending data writes that need to be replicated from the application through the remote mirroring unit after the network or system failure has been repaired. A following step is recording the data writes that are not spooled in the disk spool due to the spool overflow. The unspooled data writes are recorded in a spool overflow list. The spool overflow list is used to enable subsequent resynchronization of a standby storage system with the primary storage system for the application.

Another detailed aspect of the present invention is a device for handling disk spool overflow in a remote mirroring system. The device comprises a data transaction application that includes a plurality of data blocks that are intended to be replicated in a mirrored storage subsystem. A primary remote mirroring module having a local disk spool is included and configured to send data blocks received from the data transaction application to a standby data processing system for replication. A standby remote mirroring module operates in the standby data processing system, and includes a standby disk spool to receive the data blocks sent by the primary remote mirroring module. The device also includes a spool overflow in the primary remote mirroring module, and a memory cache records the writes of data blocks when the local disk spool has overflowed. (Comment: This whole para is a repetition of what has already been said).

Additional features and advantages of the invention will be apparent from the detailed description which follows, taken in conjunction with the accompanying drawings, which together illustrate, by way of example, features of the invention.

DETAILED DESCRIPTION

Figure 1:
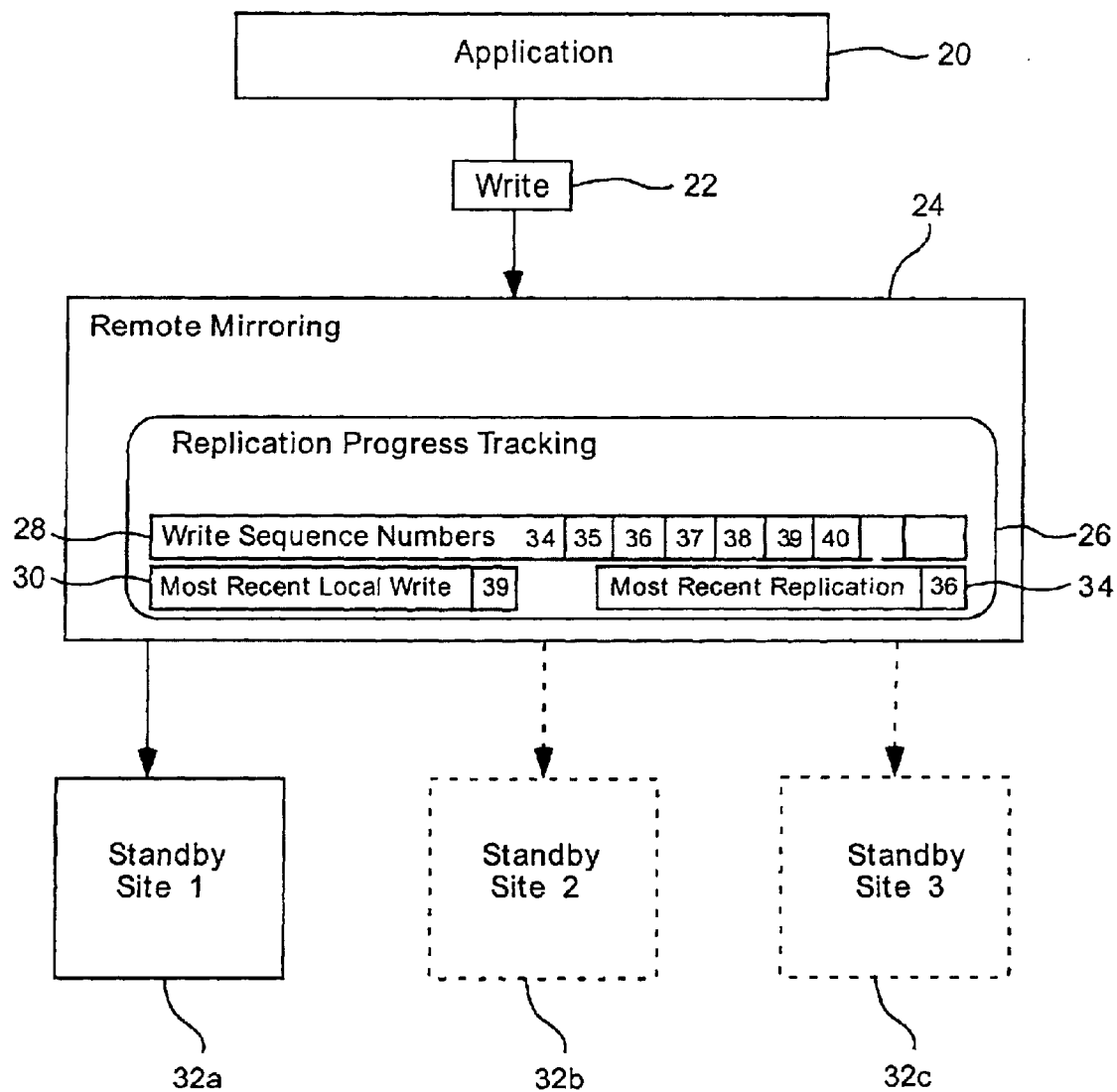
FIG. 1 is a block diagram of a remote mirroring system that uses a replication sequence number to track replication progress.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

As illustrated in FIG. 1, a system is provided for asynchronous trackable file replication in a data processing system. In accordance with one embodiment of the present invention, an application 20 writes data blocks 22 to a storage system that includes a remote mirroring module 24. The application can be a transactional data application such as a database, e-commerce, or another application that stores transactions on disk or other mass storage devices for later access or retrieval. The use of the term data blocks described here refers to the blocks of the active logs written by the application as opposed to application data.

In one embodiment of the present invention, the remote mirroring module 24 traps all application log writes and keeps the writes in a spool device in an ordered fashion to send it across a Wide Area Network (WAN) to a standby site 32a, 32b, 32c or a remote cluster. Once the data is spooled locally, the remote mirroring system sends the data across the WAN to the corresponding remote mirroring service associated with the standby site or cluster.

The application includes an interface with the remote mirroring module 24 in order to track replication progress. This interface can be an application programming interface (API) or another type of software object that communicates with the application. For every local write, an "intend to write record" is generated and stored in the disk spool. The "intend to write record" represents a record that the system wants the remote mirroring module to replicate.

The replication progress tracking module 26 creates sequence access numbers 28 for data writes that call for replication. The replication progress tracking module stores and provides access to a most recent local write sequence number 30 or the highest sequence number for writes completed to the local disk. A most recent replication sequence number 34 is also stored that represents the highest sequence number for a write that has been replicated.

By correlating and/or comparing the most recent local write and the most recent replication numbers, the replication status of specific application writes can be tracked. This tracking allows the remote mirroring system to perform replication recovery by resending the spool entries that were not confirmed as replicated when the system crash occurred. This ensures that the mirror copy is re-synchronized or "re-silvered" in recovery situations. Although this embodiment describes using sequence numbers, other types of digital records can be used to represent the intent to write record and the replication completed record.

Replication methods that have been used in the prior art do not permit tracking of asynchronous writes. In the past, systems have replicated data in a synchronous manner which means that replication of a specific data block must be completed before the application can be permitted to proceed. Furthermore, prior systems have provided application crash recovery, massive mirror recovery, and media recovery capabilities but no partial or dynamic mirroring recovery services.

An unplanned but automatic role reversal can occur in the situation where the standby cluster or mirror assumes the role of the primary cluster because of a disaster on the original primary cluster. This means that the new primary cluster can use the "intent to write" information of the old primary cluster that is available in the spool. As before, this allows the new primary system to identify the individual data blocks that need to be re-synchronized on the new standby cluster (once it has recovered). This means that incremental replication can take place even if the clusters reverse roles.

Figure 2:
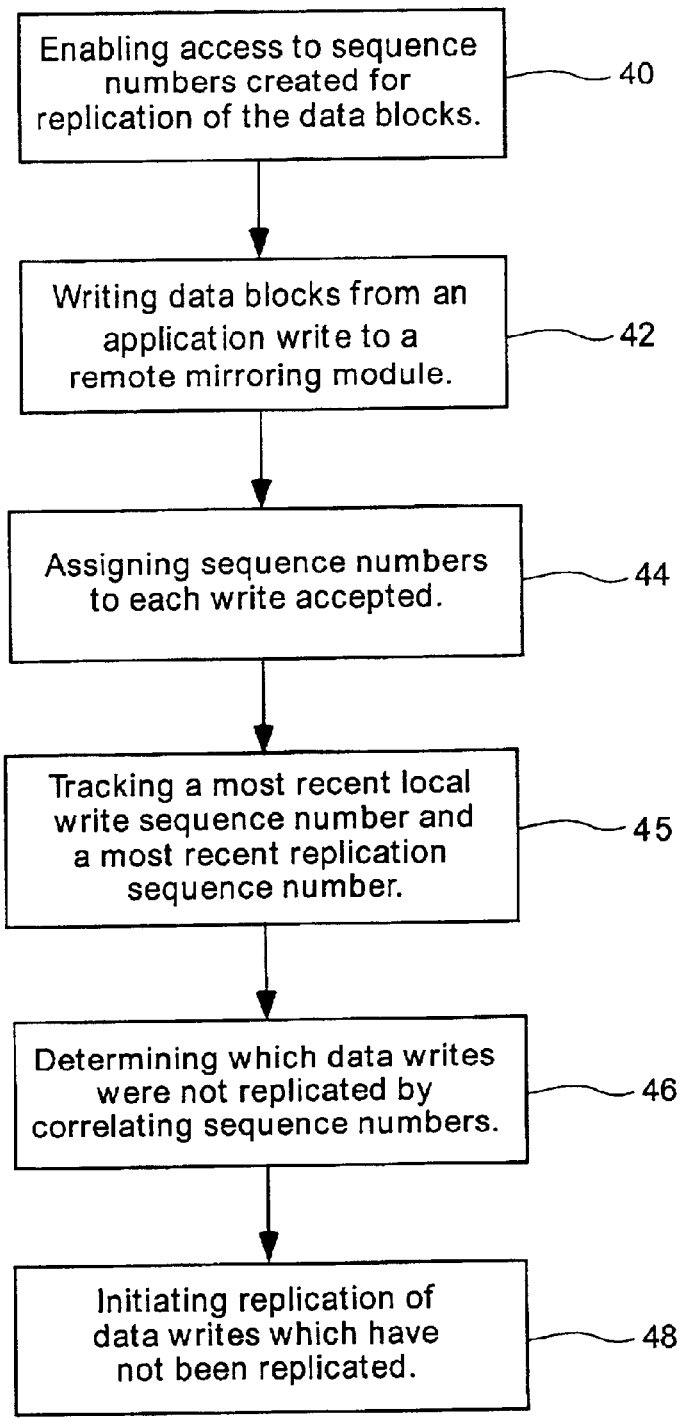
FIG. 2 is a flow chart of the steps that can be taken to perform remote replication using the components of FIG. 1.

The embodiment of the present invention as described by FIG. 1 includes a corresponding method for asynchronously tracking the mirroring of data blocks from an application to a standby data processing unit, which is subject to system failure and located at a standby site. The method is illustrated in FIG. 2 and includes the step of enabling access to sequence numbers created for use in replication of the data blocks 40. As discussed, the interface to these sequence numbers can be an API or some other procedural interface. Another step is writing data blocks to a remote mirroring module as a result of an application write 42. The remote mirroring module that receives the data blocks can contain and is generally associated with the replication tracking module.

Next, write sequence numbers are assigned to each application write that is accepted 44. The system also tracks the most recent local write sequence number and the most recent replication sequence number 45, and this can take place using the replication tracking module. It can then be determined which data writes were not replicated pursuant to a system failure by correlating the most recent local write sequence number and the most recent replication sequence number 46. An additional step is initiating replication of the data writes for which replication has not taken place 48.

There are a number of advantages provided by tracking the replication of data blocks as described above. By recording the progress of replication, an application can determine when to report that a specific customer transaction is reliably replicated. This way an application can request a confirmation of transactions that that have been successfully replicated. In addition, minimal to no application modifications are required to use this technique from the application side. The application must only be enabled to receive a confirmation stating that the transaction was replicated. If no confirmation is desired, then the application can just make write requests as before with no modifications.

Another advantage of the present system is that it speeds up the replication process because massive mirroring of the entire data system is not necessary when replication fails. Instead, replication integrity is preserved by focusing on in-order repair rather than massive out-of-order repair as has been used by the prior art. This maximizes the replication efficiency and avoids outdated replicated data.

Figure 3:
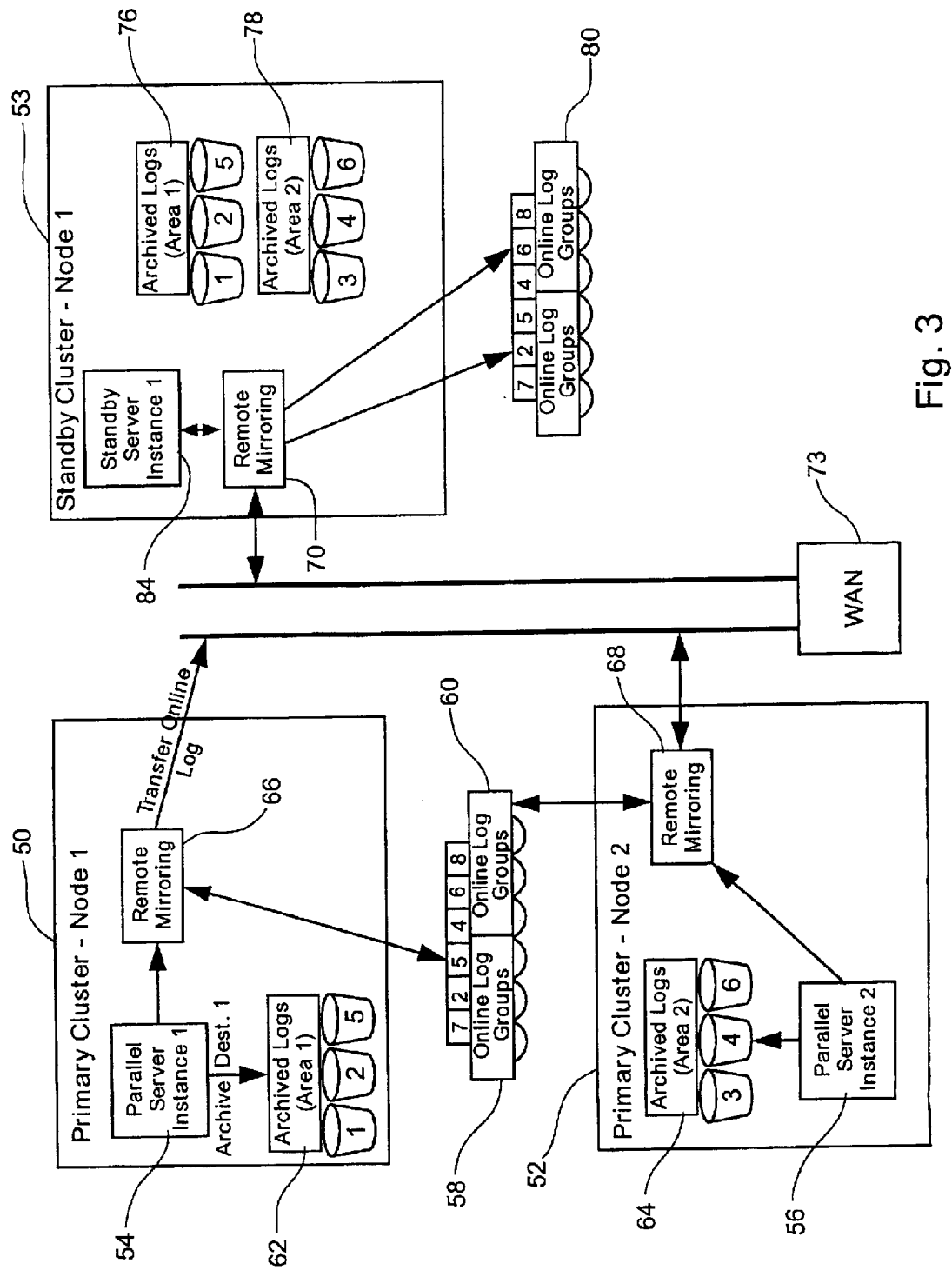
FIG. 3 is a block diagram of a database system with a remote standby cluster that is mirrored across a network.

FIG. 3 illustrates how the present invention in FIGS. 1-3 can be included in a database embodiment in order to provide remote mirroring. This embodiment describes the use of the present invention to create mirrored online logs for a database system. This figure illustrates the interactions involved in replicating database log files across a WAN to a remote standby site or cluster.

The system has a first primary cluster node 50 and a second primary cluster node 52 and these two nodes form a database cluster. A disk subsystem can be shared by these nodes and the nodes can be connected by a high-speed local link. Each node has a separate instance of a parallel database server 54, 56 and each node can have its own copy of online redo logs 58, 60. As is well known by those skilled in the art, redo log files store all the information needed to perform database recovery and record every change made to a database structure. When the online redo logs are filled, they are archived and then transferred into the archive log areas 62, 64.

The steps involved in online redo log replication will now be discussed in further detail. First, the parallel database servers 54, 56 make entries in the online redo logs 58, 60. Remote mirroring modules 66, 68 trap the disk subsystem writes to the online logs. This trapped information is then sent to the standby remote mirroring device 70 through the remote mirroring or replication transport. A WAN 73 is used to transfer the information between the primary site and the standby site.

In FIG. 3, the remote mirroring device 66 corresponds generally to the remote mirroring module 24 in FIG. 3. When the remote mirroring device traps the online logs writes, then the writes are assigned a write sequence number. After the remote mirroring module in the standby cluster 53 has completed the replication, it sends a notification to the remote mirroring in the primary cluster 50. At this time, the most recent replication sequence number stores the sequence number of the replicated data writes for which it has received a notification. As described previously, the most recent local write and most recent replication sequence numbers are used to perform remote mirroring recovery in the case of a WAN outage or system crash.

A separate mechanism for remote mirroring is used to transfer archive files from the primary to standby site. The archives are applied by the standby server to the standby database. On a remote failover, the new primary (formerly the standby) performs database recovery using the mirror of the online redo log files. The remote mirroring module can be a UNIX device driver that works by trapping all operating system writes for a storage device and mirroring these writes across disks on remote systems as described above.

Referring again to FIG. 3, another important aspect of the present invention will now be discussed. A disk spool is contained in the remote mirroring module 66 of the primary cluster 50 (i.e. the local side) and another disk spool is located in the remote mirroring module 70 of the standby cluster 53. The disk spool allows the application to write data blocks to the remote mirroring module even when the remote mirroring module is not able to actually transfer the data blocks over the WAN 73 because of network or remote system failure.

Prior art replication solutions either always spool to disk or do not guarantee against periods of loss of integrity during repair of the replication or remote system. In the past when the spool has been filled, then the system must restart the mirroring using massive out-of-order mirroring of the database logs when the system or network communications have recovered.

One drawback of writing to the local spool device for every data block write is that it doubles the spool disk I/O. As a result, the present invention includes a performance feature called demand spooling or lazy spooling, where a write to the spool is cached (and not written to disk spool) until a new write request arrives to the same disk block. In other words, the spool writes are delayed until a conflicting write request is received for the same disk block. This avoids spool writes when the network or WAN is available and the data block writes are being replicated faster than new write requests are coming to the same disk blocks.

In the event a system crash happens, the lazy spooler can rebuild the spool from the local copy of the disk. This is because the image is not affected by a new write to the same area and the system spools the old request that conflicts with the new write. More specifically, when lazy spooling is turned on and a system crash occurs, then the spool cache is lost. The spool cache is then recovered by re-reading the actual disk block locations from the local data disks. The identities of the disk block locations that need to be recovered are obtained by checking the "intent to write records". In lazy spooling, writes are cached in memory until conflicting writes or memory constraints trigger flushing of the cached information to spool disk. Since the demand spooling is a performance enhancement feature, the demand spooling may be turned on or off as the performance feature is needed.

This demand spooling architecture (or lazy spooling) provides at least two advantages. First, a lazy recovery mechanism allows the crash recovery to be performed in parallel with new incoming transaction writes. This increases the availability of the processing system after a system failure. Second, if the spool cache is large enough to meet the storage demands created by the WAN delay or bandwidth reduction, then the system may not need to write to the spool until a conflicting write request is made to the same disk block.

As a result of demand spooling, a minimum amount of pre-logging and post-logging is done for each application write and this minimizes the disk I/O replication overhead. When a write request is made, an intent to write record is created in the remote mirroring unit. Each intent to write record represents a single write request and is only 32 bytes per write request. In addition, when there are parallel write requests, the system uses a "group write" mechanism where a single I/O can flush a group of intent to write requests. This group write also reduces the pre-logging overhead. The post-logging can also be reduced through the demand spooling mechanism, because it minimizes the number of spool writes that take place.

The invention can also include a feature that provides a disk spool overflow handled by tracking unspooled writes in a bit map. These bit maps guide subsequent mirror resynchronization or 'resilvering'. For spooled writes, the spooling algorithm guarantees that the contents of the write are present in the bit map or spool disk.

Figure 4:
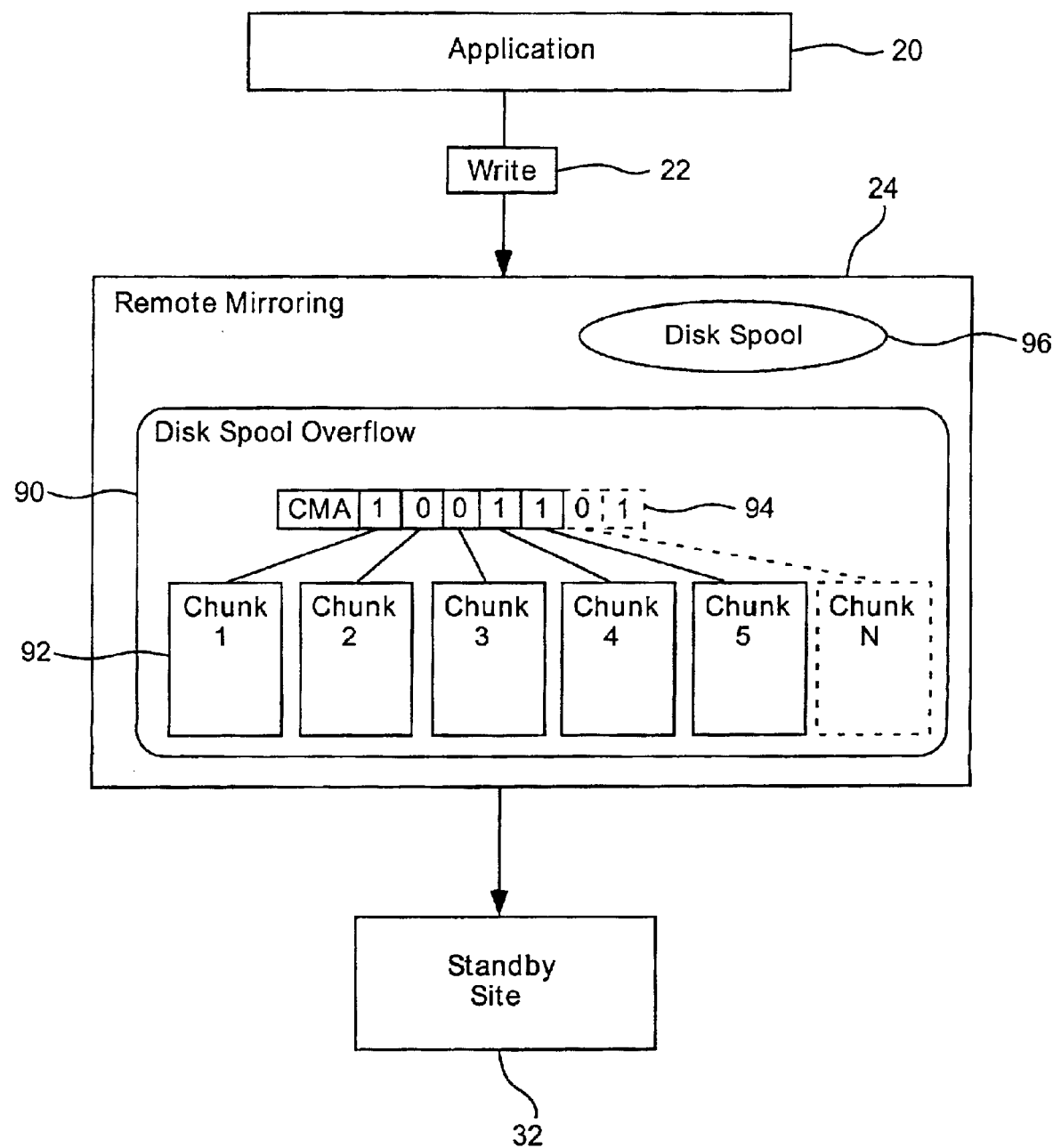
FIG. 4 is a block diagram of disk spool overflow that is included within a remote mirroring module.

As illustrated in FIG. 4, one implementation of a spool overflow condition is as follows. The application 20 writes data blocks 22 that are received in the remote mirroring module 24 and spooled. In other words, a disk spool area is defined to persistently record writes to the local disk. When the local disk spool 96 overflows, the remote mirroring system stops spooling. The spool includes an allocated storage space called the chunk map area (CMA) 94 in a disk spool overflow 90. The CMA is a representation of the log disk or the disk to be remotely mirrored and is persistent in the spool header. Each bit in the CMA bit map represents an associated chunk 92. A chunk is defined as a set of disk blocks (e.g. 1K per block) and the typical size of chunk of disk blocks is on the order of 1 megabyte (1 MB). The bit in the CMA is set when data has been written to any part of the 1 MB chunk.

For example, if a write request comes to the $2048^{th}$ block that is within the second chunk, then the bit-offset number 2 in the CMA will be set. This is a dirty chunk map for all the write requests. The present invention can apply the dirty chunk data onto the remote mirror in a way that preserves the write order. A spool typically overflows when the WAN is down for a long duration. Once the spool overflows, the remote mirroring system starts tracking writes using the dirty chunk map in the CMA.

When the WAN is available again, the remote mirroring unit is able to drain the spool, and it starts replicating the entire list of dirty chunks 92 (resilvering) along with any new writes that may be entered into the system. This stream of data is treated by the mirroring module in the standby cluster as 1 full consistent set and the data will either be atomically applied all together or no data will be applied at all. In order to produce this consistent data set, a spool device is maintained at the standby site as well and all the incoming inconsistent data is spooled until the full consistent set has been reached. Then the standby site applies all the data to the database together. If a crash happens while this atomic apply is going on, the remote mirroring system will continue the atomic apply on a restart.

Figure 5:
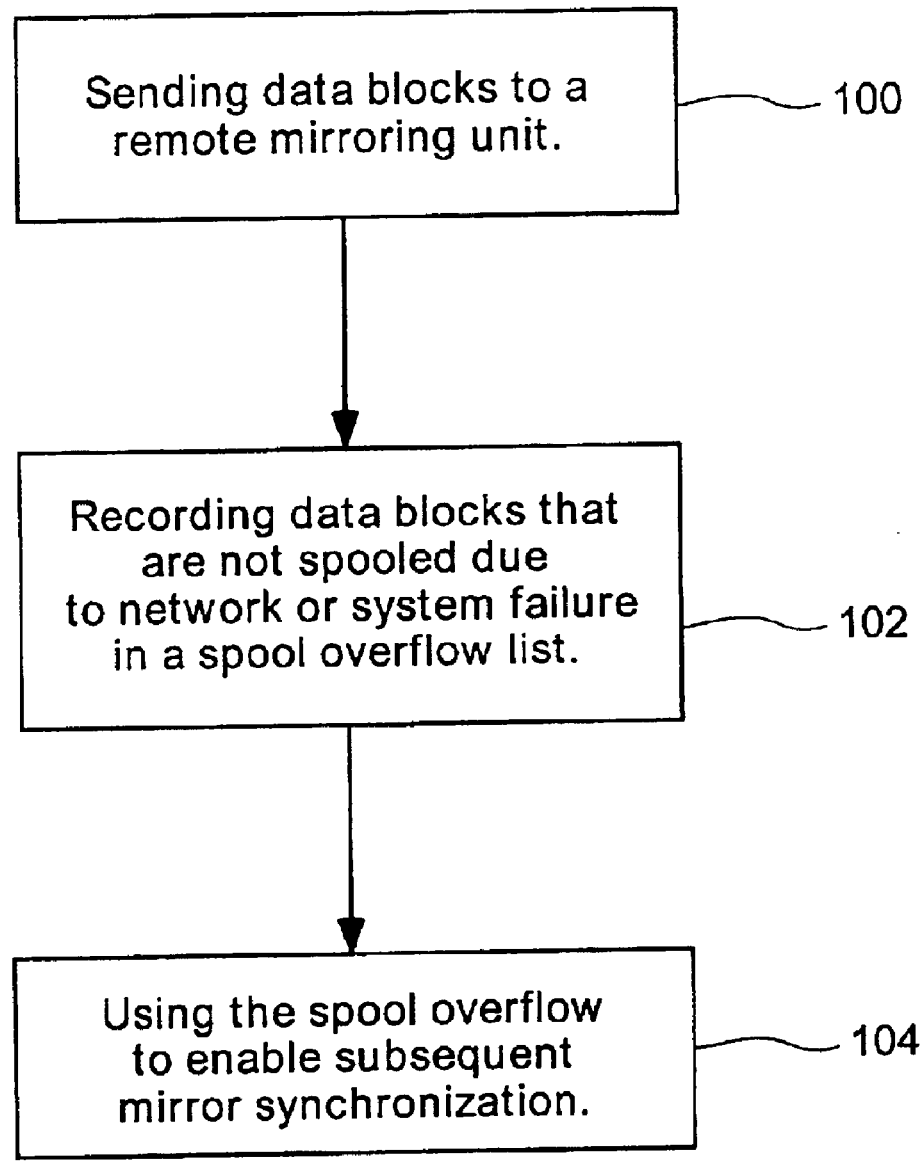
FIG. 5 is a flow chart of the steps that can be taken in order to perform recovery from spool overflow.

FIG. 5 illustrates a method for handling overflow of disk spool writes in a remote mirroring unit subsequent to a standby system or network failure. The remote mirroring unit supports an application having a plurality of data blocks stored in a primary storage system. System failures when a data block will not be spooled are generally a standby system crash or a spool overflow due to a long duration WAN outage. (Note that, in the case of a local system crash, the in-progress writes may not have been spooled. Since the pre-logging has written an "intent to write record", the system can be recovered by re-reading the local copy of the disk blocks and re-requesting replication. Another name for this is "in-line silvering".)

Accordingly, the method includes the step of sending data blocks that need to be replicated from the application to the remote mirroring unit which includes a disk spool 100. Then the data blocks that are not spooled in the disk spool due to a network or standby failure are recorded in a spool overflow list 102. In other words, when the spool overflows due to long duration outages, then the spool overflow list or chunk map area (CMA) is used to keep track of the dirty chunks. Another step is using the spool overflow list to enable subsequent resynchronization of a standby storage system with the primary storage system for the application 104. The spool overflow list of the data blocks that were not sent to the disk spool can be stored in a chunk map area (CMA), when the disk spool cannot accept further input.

It is to be understood that the above-described arrangements are only illustrative of the application for the principles of the present invention. Numerous modifications and alternative arrangements can be devised without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment (s) of the invention, it will be apparent to those of ordinary skill in the art that numerous modifications can be made without departing from the principles and concepts of the invention as set forth in the claims.

What is claimed is:

1. A method for asynchronously tracking the replication of data writes, from an application that is subject to system and network failure, to a standby data processing unit located at a standby site, the method comprising the steps of:

(a) enabling access to sequence numbers created for use in replication of the data writes;

(b) sending the data writes from an application write to a remote mirroring module;

(c) assigning sequence numbers to each data write accepted;

(d) tracking a most recent local write sequence number for a local data write and a most recent replication sequence number for replicated data writes;

(e) determining when data writes at a local site have been successfully replicated at the standby site by correlating the most recent local write sequence number and most recent replication sequence number; and (f) initiating replication of the data writes for which replication has not taken place.

2. A method in accordance with claim 1, further comprising the step of comparing the most recent local write sequence number and most recent replication sequence number to identify a group of data writes to be re-sent through the remote mirroring module.

3. A method in accordance with claim 1, further comprising the step of beginning the replication recovery with the data write immediately following the most recent replication sequence number that has been recorded.

4. A method in accordance claim 1, further comprising the step of resubmitting replication requests through the remote mirroring system for each data write that has a sequence number higher than the most recent replication sequence number and less than or equal to the most recent local write sequence number.

5. A method in accordance with claim 1, further comprising the step of determining when to report that a specific application transaction has been reliably replicated based on the most recent replication sequence number tracked for data blocks that have been replicated.

6. A method in accordance with claim 1, further comprising the step of performing in-order mirror resynchronization by replicating data blocks with sequence numbers that are greater than the most recent replication sequence number.

7. A method in accordance claim 1, further comprising the step of using the most recent replication sequence number to determine the last data write replicated.

8. A method for handling overflow of disk spool writes in a remote mirroring unit subsequent to a network or system failure, comprising the steps of:

(a) sending data writes that need to be replicated from the application through the remote mirroring unit which includes a disk spool;

(b) recording data writes that are not spooled in the disk spool due to a spool overflow, wherein the unspooled data writes are recorded in a spool overflow list; and (c) using the spool overflow list to enable subsequent resynchronization of a standby storage system with the primary storage system for the application.

9. A method in accordance with claim 8, further comprising the step of storing the spool overflow list of data blocks that were not sent to the disk spool in a chunk map area, when the disk spool cannot accept further input.

10. A method in accordance with claim 8, further comprising the step of storing the spool overflow list of the data blocks that were not sent to disk spool in a bit map to guide further resynchronization of the standby storage system with the application's primary storage system.

11. A method in accordance with claim 9, further comprising the step of resynchronizing the standby storage system with the application's primary storage system using the bit map to determine which data blocks need to be replicated.

12. A method in accordance with claim 9, further comprising the step of performing synchronization of the standby storage system with the application's primary storage system using the bit map.

13. A method in accordance with claim 9, further comprising the step of using a chunk map area as the bit map, wherein each chunk map element maps to a storage chunk that can have data blocks written into the chunk.

14. A method in accordance with claim 8 further comprising the step of reversing the roles of the standby storage system and the primary storage system, wherein a new standby storage system is synchronized with a new primary storage system using information in the spool to minimize the amount of information that is shipped between primary storage system and standby storage system.

15. A device for handling disk spool overflow in a remote mirroring system, comprising:
   (a) a data transaction application that includes a plurality of data blocks that are intended to be replicated in a mirrored storage subsystem;
   (b) a primary remote mirroring module having a local disk spool, configured to send data blocks received from the data transaction application to a standby data processing system for replication;
   (c) a standby remote mirroring module, operating in the standby data processing system, including a standby disk spool to receive the data blocks sent by the primary remote mirroring module; and
   (d) a spool overflow in the primary remote mirroring module, including a memory cache, for recording writes of data blocks when the local disk spool has overflowed.

16. A device as in claim 15, further comprising a bit map that is associated with the spool overflow in order to track unspooled data block writes.

17. A device in accordance with claim 15, further comprising cache memory associated with the primary remote mirroring system, wherein the cache memory is used to store data blocks prior to transfer of the data blocks to the disk spool.

18. A device in accordance with claim 15, wherein the primary remote mirroring module and the standby remote mirroring module are both software programs.

19. A method for decreasing the number of writes to a disk spool in a remote mirroring unit in order to reduce the amount of disk spool input and output (I/O) taking place, wherein the remote mirroring unit supports an application having a plurality of data blocks stored in a primary storage system, comprising the steps of:
   (a) sending data blocks that need to be replicated from the application to the remote mirroring unit which includes a disk spool;
   (b) delaying data blocks writes to the disk spool;
   (c) writing data blocks to the disk spool when a conflicting write request comes to the same data block; and
   (d) replicating the data blocks to resynchronize a standby storage system with the primary storage system for the application.

20. A method in accordance with claim 19, further comprising the step of minimizing spool writes by holding data block writes in a cache located in the remote mirroring unit.

21. A method in accordance with claim 19, further comprising the step of storing writes of the data blocks in a cache until a conflicting transaction write triggers transfer of the cached data blocks to the disk spool.

22. A method in accordance with claim 19, further comprising the step of storing writes of the data blocks in a cache until memory constraints trigger the transfer of the cached data blocks to the disk spool.

23. An article of manufacture, comprising:
a computer usable medium having computer readable program code means embodied therein for asynchronously tracking the replication of data writes, from an application that is subject to system and network failure, to a standby data processing unit located at a standby site, the computer readable program code means in the article of manufacture comprising:
   (a) computer readable program code means for enabling access to sequence numbers created for use in replication of the data writes;
   (b) computer readable program code means for sending the data writes from an application write to a remote mirroring module;
   (c) computer readable program code means for assigning sequence numbers to each data write accepted;
   (d) computer readable program code means for tracking a most recent local write sequence number for a local data write and a most recent replication sequence number for replicated data writes;
   (e) computer readable program code means for determining when data writes at a local site have been successfully replicated at the standby site by correlating the most recent local write sequence number and most recent replication sequence number; and
   (f) computer readable program code means for initiating replication of the data writes for which replication has not taken place.

24. An article of manufacture, comprising:
a computer usable medium having computer readable program code means embodied therein for handling overflow of disk spool writes in a remote mirroring unit subsequent to a network or system failure, the computer readable program code means in the article of manufacture comprising:
computer readable program code means for sending data writes that need to be replicated from the application through the remote mirroring unit which includes a disk spool;
computer readable program code means for recording data writes that are not spooled in the disk spool due to a spool overflow, wherein the unspooled data writes are recorded in a spool overflow list; and
computer readable program code means for using the spool overflow list to enable subsequent resynchronization of a standby storage system with the primary storage system for the application.

25. A device for asynchronously tracking the replication of data writes, from an application that is subject to system and network failure, to a standby data processing unit located at a standby site, comprising:
   (a) means for enabling access to sequence numbers created for use in replication of the data writes;
   (b) means for sending the data writes from an application write to a remote mirroring module;
   (c) means for assigning sequence numbers to each data write accepted;
   (d) means for tracking a most recent local write sequence number for a local data write and a most recent replication sequence number for replicated data writes;
   (e) means for determining when data writes at a local site have been successfully replicated at the standby site by correlating the most recent local write sequence number and most recent replication sequence number; and (f) means for initiating replication of the data writes for which replication has not taken place.

26. A device as in claim 25, further comprising a means for comparing the most recent local write sequence number and most recent replication sequence number to identify a group of data writes to be re-sent through the remote mirroring module.

27. A device for handling overflow of disk spool writes in a remote mirroring unit subsequent to a network or system failure, comprising:
- (a) means for sending data writes that need to be replicated from the application through the remote mirroring unit which includes a disk spool;
- (b) means for recording data writes that are not spooled in the disk spool due to a spool overflow, wherein the unspooled data writes are recorded in a spool overflow list; and
- (c) means for using the spool overflow list to enable subsequent resynchronization of a standby storage system with the primary storage system for the application.

28. A device as in claim 27, further comprising means for storing the spool overflow list of data blocks that were not sent to the disk spool in a chunk map area, when the disk spool cannot accept further input.

29. A device as in claim 27, further comprising means for storing the spool overflow list of the data blocks that were not sent to disk spool in a bit map to guide further resynchronization of the standby storage system with the application's primary storage system.

* * * * *